US008412975B2

(12) United States Patent
Foster

(10) Patent No.: US 8,412,975 B2
(45) Date of Patent: Apr. 2, 2013

(54) USB BASED SYNCHRONIZATION AND TIMING SYSTEM

(75) Inventor: Peter Graham Foster, Belair (AU)

(73) Assignee: Chronologic Pty. Ltd., Adelaide (AU)

( * ) Notice: Subject to any disclaimer, the term of this patent is extended or adjusted under 35 U.S.C. 154(b) by 604 days.

(21) Appl. No.: 12/529,112

(22) PCT Filed: May 12, 2008

(86) PCT No.: PCT/AU2008/000663
§ 371 (c)(1),
(2), (4) Date: Oct. 2, 2009

(87) PCT Pub. No.: WO2008/138053
PCT Pub. Date: Nov. 20, 2008

(65) Prior Publication Data
US 2010/0058097 A1  Mar. 4, 2010

Related U.S. Application Data

(60) Provisional application No. 60/938,148, filed on May 15, 2007.

(51) Int. Cl.
*G06F 1/12* (2006.01)
*G06F 13/42* (2006.01)
*H04L 5/00* (2006.01)
*H04L 7/00* (2006.01)

(52) U.S. Cl. ......... 713/400; 713/500; 713/503; 713/600

(58) Field of Classification Search .................. 713/400, 713/500, 503, 600; 710/58, 61
See application file for complete search history.

(56) References Cited

U.S. PATENT DOCUMENTS

| 4,847,516 | A | 7/1989 | Fujita et al. |
| 5,268,656 | A | 12/1993 | Muscavage |
| 6,625,743 | B1 | 9/2003 | Gulick |
| 6,775,724 | B2 * | 8/2004 | Toshitani et al. ............... 710/60 |
| 7,443,213 | B2 * | 10/2008 | Crawley ......................... 327/156 |
| 7,539,793 | B2 * | 5/2009 | Foster et al. .................... 710/61 |
| 2003/0041274 | A1 | 2/2003 | Platteter et al. |
| 2004/0189405 | A1 | 9/2004 | Shah et al. |
| 2006/0166627 | A1 | 7/2006 | Crawley |
| 2007/0174727 | A1 * | 7/2007 | Liao et al. ....................... 714/43 |
| 2009/0222685 | A1 * | 9/2009 | Foster et al. .................. 713/500 |

FOREIGN PATENT DOCUMENTS

| EP | 1 199 641 | 4/2002 |
| JP | 2002-164873 A | 6/2002 |
| WO | WO 99/08196 | 2/1999 |
| WO | WO 2004/008330 | 1/2004 |

OTHER PUBLICATIONS

Chinese Patent Office Communication (Chinese Patent Application No. 200880007208.9), issued May 5, 2011 (English translation included).
European Search Report for European Patent Application No. 08747934.1, completed Feb. 25, 2011.
International Preliminary Report on Patentability for International Patent Application No. PCT/AU2008/000663, issued Nov. 17, 2009.
International Search Report from International Application No. PCT/AU2008/000663, mailed Jul. 22, 2008, and search completed Jul. 16, 2008.
English Translation of Notice of Reasons for Rejections issued in connection with Japanese Application No. 2010-507760, dated Sep. 25, 2012 (7 pages).

* cited by examiner

*Primary Examiner* — Jaweed A Abbaszadeh
(74) *Attorney, Agent, or Firm* — Clark & Elbing LLP

(57) ABSTRACT

A synchronization apparatus, comprising: a USB device having a USB microcontroller, circuitry for observing USB traffic, and circuitry for decoding from a USB data stream a periodic data structure (such as a clock carrier signal) containing information about a distributed clock frequency and phase and outputting a decoded carrier signal; and circuitry for receiving the decoded carrier signal, for generating a software interrupt upon receipt of a predefined data packet (such as a SOF packet) and for passing the software interrupt to the USB microcontroller; wherein the USB microcontroller is configured to respond to the software interrupt (such as with an interrupt service routine provided therein) by generating an output signal adapted to be used as a synchronization reference signal.

19 Claims, 4 Drawing Sheets

USB BASED SYNCHRONIZATION AND TIMING SYSTEM

CROSS-REFERENCE TO RELATED APPLICATIONS APPLICATION

This application is the U.S. National Stage of International Application No. PCT/AU2008/000663, filed on May 12, 2008, which is based on and claims the benefit of the filing date of U.S. Patent Application Ser. No. 60/938,148, filed May 15, 2007, the content of which as filed is incorporated herein by reference in its entirety.

FIELD OF THE INVENTION

The present invention relates to a method and apparatus for providing a USB based synchronization and timing system, of particular but by no means exclusive use in providing clocks, data acquisition and automation and control of test and measurement equipment, instrumentation interfaces and process control equipment, synchronized to an essentially arbitrary degree in either a local environment or in a distributed scheme.

BACKGROUND OF THE INVENTION

The USB specification is intended to facilitate the interoperation of devices from different vendors in an open architecture. USB data is encoded using differential signalling (viz. two wires transfer the information) in the form of the difference between the signal levels of those two wires. The USB specification is intended as an enhancement to the PC architecture, spanning portable, desktop and home environments.

The USB specification assumes that devices differ. This is true for the intended environments in which devices from a multiplicity of manufacturers are connected, but there exist other environments (such as certain common industrial or laboratory environments) that require a specification for operating multiple devices of a similar nature in a synchronized manner. The specification does not sufficiently address this issue. Such environments are typically those where testing, measuring or monitoring is performed, and which require the devices to be synchronized to a more accurate degree than is specified. The USB specification allows limited inter-device synchronization by providing a 1 kHz clock signal to all devices. However, many laboratory and industrial environments require synchronization at megahertz frequencies and higher.

USB employs a tiered star topology, where hubs provide attachment points for USB devices. The USB host controller which is located on the user's personal computer (PC), laptop or personal digital assistant (PDA) contains the root hub, which is the origin of all USB ports in the system. The root hub provides a number of USB ports to which USB functional devices or additional hubs may be attached.

In turn, one can attach more hubs (such as USB composite devices) to any of these ports, which then provide additional attachment points via ports for further USB devices. In this way, USB allows a maximum of 127 devices (including hubs) to be connected, with the restriction that any device may be at most five levels deep.

The root hub in the host transmits a Start of Frame (SOF) signal packet every 1 ms to every device, the time between two SOF packets being termed a frame. Each module receives this SOF packet at a different time, owing to electrical delays inherent in the USB topology, which means that there may be a significant time delay (specified as ≦380 ns) between the receipt of a signal at a device connected directly to the host controller and at a device that is five levels down. This is a severe restriction when it is desired to synchronize devices at megahertz levels and above. Furthermore the USB specification allows the host controller to fail to transmit up to five consecutive SOF tokens.

Current synchronization between a USB host and a USB device is possible by two types of USB transfers, Interrupt and Isochronous. Interrupt transfers allow guaranteed polling frequencies of devices with minimum periods of 125 µs, whereas isochronous transfers guarantee a constant transfer rate. Both methods require there to be traffic between the device and host for synchronization to take place and therefore reserve more bandwidth for higher degrees of synchronization. This unfortunately means that the available USB bandwidth can be used up before the maximum number of devices has been connected. This approach also places on the host the great computational burden of keeping 127 devices synchronized to the host by means of software, yet still fails to address maintaining synchrony between the devices as to the host the individual devices represent separate processes.

Devices that contain a physical transducer of some kind, such as a laser diode or a photodetector, may require clock and trigger information. A device such as a laser diode with a modulated light output at 1 MHz may use a clock signal to perform transducer functions at regular intervals or at a constant frequency. A trigger signal is usually used to start or end an operation at a set time. In the laser diode example, a trigger signal could be used to turn the modulated light output on or off.

These clock and trigger signals can be used to synchronize a multiplicity of devices to each other (and hence constitute what is referred to below as "synchronization information"), provided that the signals are common and simultaneous to all devices. 'Common' and 'simultaneous' here mean that the variation in time of these signals between the devices is less than a specified quantity, δt. In the laser diode example, this would enable a multiplicity of laser diodes to modulate their light output at one frequency. The modulation frequency of all devices would be the same, and their waveforms would be in-phase. The current USB specification (viz. 2.0) allows for a δt of up to 0.35 µs. For a signal with a frequency of 1 MHz and a period of 1.0 µs, this delay represents almost half of the period. It is thus unusable as synchronization information for routine use.

Devices such as hubs and USB controller chips commonly use some amount of phase locking in order to decode the USB protocol. It is the purpose of the SYNC pattern in the USB protocol to provide a synchronization pattern for another electronic circuit to lock to. However, this is intended to synchronize the device to the USB bit streams to an accuracy sufficient to interpret MHz bit streams. It is not intended to synchronize two separate devices to each other to the level required by many test and measurement instruments. The USB specification—to the extent that it deals with inter-device synchronization—is mainly concerned with synchronizing a USB-CD audio stream sufficiently for output on a USB-speaker pair. The requirements of such an arrangement are in the kHz range and, for this application, the USB specification is satisfactory. However, the specification does not address the potential problems of synchronizing, for example, 100 USB-speaker pairs.

As discussed above, USB communication transfers data during regular 1 ms frames (or, in the case of the High-Speed USB specification, in eight micro-frames per 1 ms frame). A Start of Frame (SOF) packet is transmitted to all but Low-Speed devices at the beginning of each frame and to all High-Speed devices at the beginning of each micro-frame. The SOF packet therefore represents a periodic low resolution signal broadcast to all but Low-Speed devices connected to a given Host Controller.

This SOF packet broadcast occurs at a nominal frequency of 1 kHz (in the case of the High-Speed USB specification, 8 kHz). However the USB specification allows a very large frequency tolerance (by instrumentation standards) of some 500 parts per million. The background art utilises this low resolution frequency signal that is broadcast to each of the devices to provide clock synchronization, but only to the somewhat ambiguous frequency provided by the USB Host Controller.

U.S. Pat. No. 6,343,364 (Leydier et al.) discloses an example of frequency locking to USB traffic, which is directed toward a smart card reader. This document teaches a local, free-running clock that is compared to USB SYNC and packet ID streams; its period is updated to match this frequency, resulting in a local clock with a nominal frequency of 1.5 MHz. This provides a degree of synchronization sufficient to read smart card information into a host PC but, as this approach is directed to a smart card reader, inter-device synchronization is not addressed.

U.S. Pat. No. 6,012,115 and subsequent continuation U.S. Pat. No. 6,226,701 (Chambers et al.) address the USB SOF periodicity and numbering for timing. These documents disclose a computer system that can perform an accurate determination of the moment in time a predetermined event occurred within a real-time peripheral device by using the start of frame pulse transmitted from a USB host controller to peripheral devices connected to it.

However the methods taught by these documents do not involve the measurement of the frequency of a periodic data structure contained within the USB data traffic for determination of the absolute frequency of the master clock in the USB Host Controller, and in some cases rely on the provision of an additional counter in the host.

U.S. Pat. No. 6,092,210 (Larky et al.) discloses a method for connecting two USB hosts for the purpose of data transfer, by employing a USB-to-USB connecting device for synchronizing local device clocks to the data streams of both USB hosts. Phase locked loops are used to synchronize local clocks and over-sampling is used to ensure that data loss does not occur. This document, however, relates to the synchronization of the data streams of two USB hosts with each other (and with limited accuracy) such that transfer of information is then possible between said Hosts. This document does not teach any method for synchronizing a plurality of USB devices to a single USB Host or to a plurality of USB hosts.

The USB specification was written with audio applications in mind, and U.S. Pat. No. 5,761,537 (Sturges et al.) describes how to synchronize two or more pairs of speakers with individual clocks, where one pair operates off a stereo audio circuit in the PC and the other pair is controlled by the USB. Both speaker pairs use their own clocks, so they need to be synchronized so this document teaches one technique for maintaining synchronization of the audio signals despite possible clock skew between the asynchronous clocks.

U.S. patent application Ser. No. 10/620,769 (Foster et al.) discloses a synchronized version of the USB, in which the local clock of each device is synchronized on a given USB to an arbitrary degree. This document also discloses a method and apparatus for providing a trigger signal to each device within the USB such that an event may be synchronously initiated on multiple devices by the trigger signal.

FIG. 1 is a schematic diagram of an exemplary background art synchronized USB device 10, connected to a digital USB 12, via a USB bus connector 14. USB device 10 contains an integrated USB interface and microcontroller 16, USB device function circuitry (such as a digitally controlled transducer) 18, bus sampling circuitry 20, digital I/O bus decoding circuitry 22, synchronization phase comparator 24 and synchronised clock 26.

USB device 10 is connected by bus connector 14 to digital USB 12. Digital USB 12 contains USB data and control signals for the USB device 10; bus sampling circuitry 20 observes the internal USB traffic 30 and generates a replica 32 thereof. Digital I/O bus decoding circuitry 22 decodes clock carrier signal 34 from signal 32. Synchronization phase comparator 24 compares decoded clock carrier 34 with divided clock signal 36 from synchronized clock 26 such that the output local clock signal 28 (at a substantially higher frequency than carrier signal 34) is locked to carrier signal 34 in frequency and phase.

In this arrangement, synchronization is achieved by detecting and extracting information from USB 12 as USB signal traffic enters USB device 10 and by generating local clock signal 28.

This architecture for synchronization of the local clock on each of a plurality of USB devices employs periodic data structures present in the USB traffic. An embodiment disclosed in U.S. application Ser. No. 10/620,769 essentially locks the local clock in frequency and phase to the detection of a SOF packet token at the USB device. Circuitry is employed to observe traffic through the USB and decode a clock carrier signal from bus traffic (in one embodiment, SOF packets), which results in a nominal carrier signal frequency of 1 kHz (or 8 kHz for USB High Speed). The local clock signal from a controlled oscillator clock is locked to the reception of the USB SOF packet in both phase and frequency. This ensures that all devices attached to the root hub are locked in frequency to the point at which they receive the SOF packet token. However, the approach described in U.S. application Ser. No. 10/620,769 is limited in its ability to provide a precisely known clock frequency to each device.

Further, although this disclosure teaches the highly accurate clock synchronization of devices attached to a USB, the disclosed approach employs a precision controlled oscillator, typically in the form of a voltage controlled voltage oscillator, and particular care must be taken to provide stable supply voltages. A closed loop control circuit is then applied to the precision oscillator. This adds both cost and complexity to the design of a synchronized USB device.

Another synchronized USB device, disclosed in International Patent Application No. PCT/AU2007/000155 filed 15 Feb. 2007 (Foster et al.), is shown schematically in FIG. 2. The technique of this disclosure allows the generation of accurate clock frequencies on board the USB device regardless of the accuracy of the clock in the Host PC. Referring to FIG. 2, USB device 40 includes a bus connector 44, bus interface circuitry 46, a microcontroller 48, USB device function circuitry (such as a digitally controlled transducer) 50 and synchronization circuitry in the form of synchronizer 52 (comparable to digital I/O bus decoding circuitry 22, synchronization phase comparator 24 and synchronised clock 26 of FIG. 1). Bus interface circuitry 46 acts as a transceiver for USB data detected at bus connector 44, passing the USB data to microcontroller 48. USB device 40 also includes circuitry 54 that observes the internal bus link and passes a replica 56 of USB traffic 58 to synchronizer 52. Microcontroller 48 provides information 60 to synchronizer 52 for accurate frequency synthesis of clock signal 62. Microcontroller 48 communicates with device function circuitry 50 through communication bus 64.

The carrier signal, once decoded from the USB traffic, is combined with a scaling factor to generate synchronization information and hence to synthesize a local clock signal with precise control of the clock frequency. In this way, the frequency of the local clock signal can be more accurate than the somewhat ambiguous frequency of the carrier signal by the use of additional information signal 60 from microcontroller 48.

This arrangement is said to be able to produce a local clock signal to arbitrarily high frequencies, such as a clock frequency of tens of megahertz, and thus to ensure that the local clock of each device connected to a given USB is synchronized in frequency. U.S. application Ser. No. 10/620,769 also teaches a method and apparatus to further synchronize multiple local clocks in phase by measurement of signal propagation time from the host to each device and provision of clock phase compensation on each of the USB devices.

While such synchronous USB systems can perform accurate clock synchronisation between USB devices with accurate clock frequency generation, they require special hardware components to decode data present on the USB and precision determination of the moment in time of carrier signal reception. These components are required in addition to the normal USB bus interface circuitry and microcontroller (46 and 48 respectively of FIG. 2) so these approaches are not compatible with a generic implementation of USB using off the shelf USB interface microcontrollers.

Additionally, the USB specification constraints the level of capacitance that the USB device can present to the bus. The effective capacitance of USB each data line to ground in the presence of the parallel effective resistance to ground is very tightly controlled. There is generally only a small capacitance margin with compliant USB devices. Addition of a parallel data pathway circuit (comparable to that of bus sampling circuitry 20 of FIG. 1) to a conventional USB device would typically exceed the capacitance limits.

SUMMARY OF THE INVENTION

In a first broad aspect, the invention provides a synchronization apparatus, comprising:
  a USB device having a USB microcontroller, circuitry for observing USB traffic, and circuitry for decoding from a USB data stream a periodic data structure (such as a clock carrier signal) containing information about a distributed clock frequency and phase and outputting a decoded carrier signal; and
  circuitry for receiving the decoded carrier signal, for generating a software interrupt upon receipt of a predefined data packet (such as a SOF packet) and for passing the software interrupt to the USB microcontroller;
  wherein the USB microcontroller is configured to respond to the software interrupt (such as with an interrupt service routine provided therein) by generating an output signal adapted to be used as a synchronization reference signal.

The USB microcontroller may comprise the circuitry for observing the USB data stream.

The circuitry for receiving the decoded carrier signal and generating a software interrupt may be provided within the USB microcontroller, though it may alternatively be provided as circuitry external to the USB microcontroller or, indeed, external to the USB device.

The apparatus may comprise a hybrid USB interface and microcontroller that comprises the circuitry for decoding the periodic data structure and the circuitry for receiving the decoded carrier signal and generating the software interrupt.

The apparatus may comprise separate decoding hardware that generates a decoded SOF signal and passes it to the USB microcontroller, wherein the USB microcontroller generates the software interrupt in response thereto.

The periodic data structure may comprise, for example, any of the USB packet signal structures defined in the USB specification, command sequences sent to the USB device, data sequences sent to the USB device, OUT tokens, IN tokens, ACK tokens, NAK tokens, STALL tokens, PRE tokens, SOF tokens, SETUP tokens, DATA0 tokens, DATA1 tokens, or programmable bit pattern sequences in the USB data packets.

There is also provided a method for synchronizing a plurality of USB devices, employing a plurality of synchronization apparatuses as described above.

According to the first broad aspect there is also provided a synchronized USB comprising the apparatus described above.

According to a second broad aspect the present invention provides a method for assigning a validity weighting to a plurality of decoded synchronization reference signals, comprising;
  observing a decoded carrier signal;
  prompting a software interrupt based on a predefined data packet (such as a SOF packet) in the decoded carrier signal;
  executing in response to the software interrupt an interrupt service routine that generates an interrupt output signal;
  determining a USB microcontroller instruction that was executing when said software interrupt was received;
  determining a number of instruction cycles required by the USB microcontroller instruction; and
  assigning a timing validity weighting factor to the timing reference signal based on the uncertainty in reception time of software interrupt.

The second broad aspect can employ one or more statistical methods to filter, average or otherwise process the repetitive carrier signal pulses for greater accuracy and stability.

In a third broad aspect the present invention provides a method for synchronizing the local clock of a USB device, comprising;
  observing a USB data stream;
  decoding a periodic data structure from the USB data stream;
  prompting a software interrupt based on the periodic data structure;
  executing in response to the software interrupt an interrupt service routine;
  generating an interrupt output signal with the interrupt service routine;
  passing the interrupt output signal as a reference timing signal to synchronized clock circuitry having a phase locked loop architecture; and
  locking a local clock (such as a high frequency local crystal oscillator clock) in phase and frequency with the synchronized clock circuitry based on the reference timing signal.

The periodic data structure may comprise, for example, any of the USB packet signal structures defined in the USB specification, command sequences sent to the USB device, data sequences sent to the USB device, OUT tokens, IN tokens, ACK tokens, NAK tokens, STALL tokens, PRE tokens, SOF tokens, SETUP tokens, DATA0 tokens, DATA1 tokens, or programmable bit pattern sequences in the USB data packets.

The third broad aspect can also be used to generate a synchronized USB using a plurality of synchronized USB devices according to this method.

In a fourth broad aspect the present invention provides a method for synchronizing the local clock of a USB device, comprising;
- observing a USB data stream;
- decoding period data structure SOF packets in the USB data stream;
- using a free running oscillator clock with multiple outputs, each with a respective phase (which will typically differ from one another);
- upon receipt of the decoded periodic data structure selecting the output that is most in phase with the decoded periodic data structure; and
- phase adjusting the free running clock based on the selected phase to compensate for the frequency of the free running clock being incorrect or the free running clock being unsynchronized.

The method will generally comprise repeatedly selecting from the phases of the outputs a phase that is most in phase with the decoded periodic data structure and phase adjusting the free running clock based on the selected phase.

The periodic data structure may comprise, for example, any of the USB packet signal structures defined in the USB specification, command sequences sent to the USB device, data sequences sent to the USB device, OUT tokens, IN tokens, ACK tokens, NAK tokens, STALL tokens, PRE tokens, SOF tokens, SETUP tokens, DATA0 tokens, DATA1 tokens, or predefined bit pattern sequences in the USB data packets.

Thus, the most appropriate phase of the clock (which is not frequency controlled) can be chosen at each periodic data structure (e.g. SOF) event. This may be used with software (ISR) or hardware type periodic data structure detection.

The method may include using a free running oscillator with multiple phase delayed outputs.

The method may include using a free running oscillator with multi-tap delay generator to generate the multiple phases.

According to the fourth aspect there is also provided a synchronized USB using a plurality of synchronized USB devices according to the above-described method.

According to one broad aspect, the invention provides a method for distributing a timing reference signal, comprising:
- connecting a device having a processor to a data bus;
- monitoring the data bus with the processor for data signals local to the device, wherein the data contains a periodic data structure;
- the processor responding to detection of the periodic data structure by generating a software interrupt;
- the processor responding to the software interrupt by executing an interrupt service routine;
- the interrupt service routine generating a timing reference signal.

The periodic data structure may be one of a plurality of periodic data structures, and the method include the processor responding to detection of each of the periodic data structures by generating respective software interrupts, the processor responding to the software interrupts by executing respective interrupt service routines, and the interrupt service routine generating respective timing reference signals.

The method may further comprise:
- identifying a software instruction being processed by the processor during reception of the respective software interrupt;
- determining a number of instruction cycles required by the processor to execute the software instruction; and
- assigning a weighting factor to each of the respective timing reference signals, wherein the weighting factor is a measure of the uncertainty in the period of time between generation of the respective software interrupt and the respective timing reference signal.

The method may further comprise:
- generating a plurality of weighted timing reference signals by combining the plurality of weighting factors with the plurality of timing reference signals, such that the contribution of a given one of the timing reference signals is weighted by its corresponding weighting factor.

The method may further comprise:
- locking a local clock of the device to the plurality of weighted timing reference signals in both frequency and phase.

The method may further comprise:
- statistically processing the weighted timing reference signals and thereby locking the frequency and phase of the local clock more precisely.

The data bus may be a USB and the device is a USB device.

The processor may be a microcontroller with an embedded USB physical interface, or a field programmable gate array or other form of programmable logic containing an embedded USB physical interface.

In one embodiment, the periodic data structure comprises any of the USB packet signal structures defined in the USB specification, command sequences sent to the USB device, data sequences sent to the USB device, OUT tokens, IN tokens, ACK tokens, NAK tokens, STALL tokens, PRE tokens, SOF tokens, SETUP tokens, DATA0 tokens, DATA1 tokens, or predefined bit pattern sequences in the USB data packets.

In another broad aspect, the invention provides a method for weighting a plurality of clock carrier signals comprising:
- monitoring a data bus for a periodic data structure with a processor;
- the processor responding to the periodic data structure by generating a software interrupt;
- the processor responding to the software interrupt by executing an interrupt service routine;
- the interrupt service routine generating a timing reference signal;
- determining the software instruction being processed by the processor during reception of the software interrupt;
- determining a number of instruction cycles required by the processor to execute the software instruction, wherein the number of instruction cycles represents a measure of the uncertainty in determination of the time the processor issued the software interrupt; and
- weighting the plurality of clock carrier signals according to an uncertainty in the time that the processor issued the software interrupt.

The periodic data structure may be one of a plurality of periodic data structures, and the method comprise:
- the processor responding to each of the periodic data structures by generating respective software interrupts;
- the processor responding to the software interrupts by executing respective interrupt service routines;
- the interrupt service routine generating respective timing reference signals;
- assigning a weighting factor to each of the timing reference signals, wherein the weighting factor is a measure of the uncertainty in the period of time between generation of the software interrupt and the respective timing reference signal;

generating a plurality of weighted timing reference signals by combining the plurality of weighting factors with the plurality of timing reference signals, such that the contribution of a given one of the timing reference signals is weighted by its corresponding weighting factor.

The method may include determining the uncertainty in the period of time between generation of the software interrupt and the timing reference signal with a computing device.

The method may include determining the uncertainty in the period of time between generation of the software interrupt and the timing reference signal with a lookup table.

According to a broad aspect, the invention provides an apparatus for weighting a plurality of timing reference signals comprising:
  a processor or microcontroller that supports interrupt service routines;
  circuitry for observing data traffic locally to the processor;
  circuitry for decoding a periodic data structure from the data traffic;
  circuitry for generating an acknowledgement signal corresponding to decoding of the periodic data structure;
  circuitry for generating a software interrupt of the processor configured to issue an interrupt service routine upon receipt of the acknowledgement signal; and
  circuitry for generating a timing reference signal in response to commands from an interrupt service routine.

The apparatus may further comprise:
  an output for reporting which instruction was being executed when the software interrupt occurred;
  a mechanism for determining the uncertainty in the period of time between generation of the software interrupt and the timing reference signal;
  a mechanism for calculating the weighting factor for each of the plurality of timing reference signals.

The mechanism for determining the uncertainty in the period of time between generation of the software interrupt and the timing reference signal may be, for example, a computing device or a lookup table.

The processor or microcontroller may have an embedded USB physical interface. The processor or microcontroller may be a field programmable gate array or other form of programmable logic, which may optionally have an embedded USB physical interface.

The invention also provides an apparatus for synchronising a USB device, comprising:
  a USB;
  a processor or microcontroller having architecture supporting software interrupts and interrupt service routines;
  circuitry for observing USB traffic local to the USB device when the USB device is in data communication with the USB;
  circuitry for decoding a periodic data structure from traffic on the USB;
  circuitry for generating an acknowledgement signal corresponding to decoding of the periodic data structure;
  circuitry for generating a software interrupt of the processor upon receipt of the acknowledgement signal, wherein the software interrupt initiates an interrupt service routine configured so as to generate an output signal adapted to be used as a local synchronization reference signal; and
  circuitry for generating a timing reference signal in response to commands from the interrupt service routine.

The apparatus may further comprise:
  a local clock; and
  circuitry for controlling the frequency and phase of the local clock, wherein the timing reference signal is usable to control the local clock frequency and/or phase.

The processor or microcontroller may comprise the circuitry for observing USB traffic local to the USB device.

The processor or microcontroller may comprise the circuitry for decoding a periodic data structure from traffic on the USB.

The processor or microcontroller may comprise the circuitry for generating an acknowledgement signal corresponding to decoding of the periodic data structure;

The processor or microcontroller may comprise the circuitry for generating a software interrupt of the processor upon receipt of the acknowledgement signal.

The processor or microcontroller may comprise the circuitry for generating a timing reference signal in response to commands from the interrupt service routine.

The processor or microcontroller may comprise the local clock.

The circuitry for observing USB traffic local to the USB device may not be contained within the processor.

The circuitry for decoding a periodic data structure from traffic on the USB may not be contained within the processor or microcontroller.

The circuitry for generating an acknowledgement signal corresponding to decoding of the periodic data structure may not be contained within the processor.

The invention also provides a method for synchronizing the local clock of a USB device, comprising;
  observing a USB data stream;
  decoding periodic signal structure packets in the USB data stream;
  using a free running oscillator clock with multiple outputs, each with a respective phase;
  upon receipt of the decoded periodic signal structure packets, selecting from the phases of the outputs a phase that is most in phase with the decoded periodic signal structure packets; and
  phase adjusting the free running clock based on the selected phase to compensate for the frequency of the free running clock being incorrect or the free running clock being unsynchronized.

The method may comprise repeatedly selecting from the phases of the outputs a phase that is most in phase with the decoded periodic signal structure and phase adjusting the free running clock based on the selected phase.

The periodic data structure packets may comprise, for example, any of the USB packet signal structures defined in the USB specification, command sequences sent to the USB device, data sequences sent to the USB device, OUT tokens, IN tokens, ACK tokens, NAK tokens, STALL tokens, PRE tokens, SOF tokens, SETUP tokens, DATA0 tokens, DATA1 tokens, or predefined bit pattern sequences in the USB data packets.

The method may comprise using a free running oscillator with multiple phase delayed outputs.

The method may comprise using a free running oscillator with multi-tap delay.

The invention also comprises a method for synchronising the free running local clock of a device with a plurality of selectable phase shifted outputs, the method comprising:
(i) the device receiving a periodic reference signal;
(ii) on receipt of each of the periodic reference signal, the device detecting which of the plurality of selectable phase shifted outputs is most in phase with the periodic reference signal; and
(ii) employing the most in phase of the phase shifted outputs as the local clock signal.

The method may include periodically adjusting the local clock signal in phase by repeating steps (i) to (iii).

The method may include selecting the phase shifted output that is most in phase with the periodic reference signal when assessed over a plurality of clock cycles.

The method may further comprise:
determining the cumulative phase error of the free running oscillator outputs experienced during the period between successive cycles of the periodic reference signal; and
periodically selecting the next most appropriate of the plurality of phase shifted outputs, within the period between successive cycles of the periodic reference signals, in order to continually minimise the absolute phase error of the output clock signal.

It should be noted that the various features of each of the above aspects of the invention can be combined as desired.

In addition, apparatuses according to the invention can be embodied in various ways. For example, such devices could be constructed in the form of multiple components on a printed circuit or printed wiring board, on a ceramic substrate or at the semiconductor level, that is, as a single silicon (or other semiconductor material) chip.

BRIEF DESCRIPTION OF THE DRAWING

In order that the present invention may be more clearly ascertained, embodiments will now be described, by way of example, with reference to the accompanying drawing, in which.

DETAILED DESCRIPTION OF THE INVENTION

Figure 3:
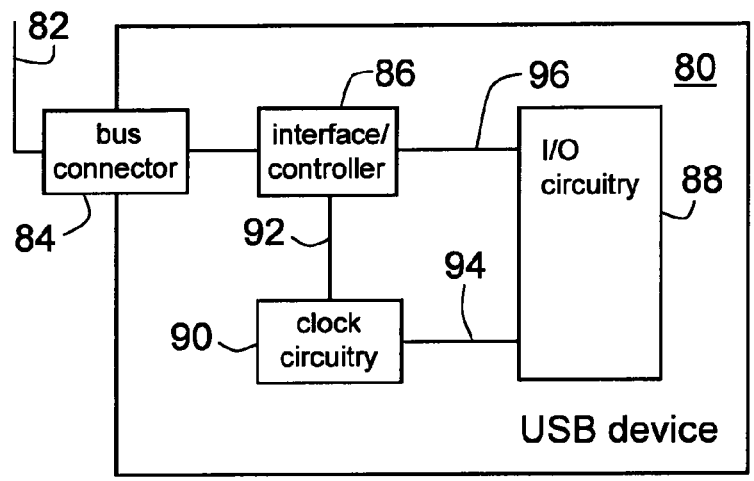
FIG. 3 is a schematic diagram of a synchronized USB device according to a first embodiment of the present invention.

A USB device according to a first embodiment of the present invention is shown schematically at 80 in FIG. 3, with a digital USB 82. USB device 80 includes a bus connector 84, for connection to USB 82, USB interface/microcontroller 86, digital input/output circuitry 88 (in the form, for example, of a digital transducer such as an analog to digital converter, pressure transducer or strain gauge) and synchronized clock circuitry 90.

Clock synchronization information in the form of a repetitive carrier signal is extracted from USB 82 by USB interface/microcontroller 86. Conventional USB microcontrollers (such as the Cypress EZUSB-FX brand series of USB microcontrollers) can be configured to execute a software interrupt on reception of the Start of Frame (SOF) packet in the USB data stream, and this is so in this embodiment; the interrupt service routine that executes in response to reception of the SOF packet is programmed to generate a reference timing signal 92 (at either 1 kHz for USB Full Speed or 8 kHz for USB High Speed), which is passed to synchronized clock circuitry 90. Synchronized clock circuitry 90 contains a phase locked loop architecture to lock a high frequency local crystal oscillator clock in phase and frequency using low frequency reference signal 92.

Synchronized output clock signal 94 is configured to synchronously control the operation of digital input/output circuitry 88 according to data and commands 96 provided from USB interface/microcontroller 86. This architecture allows decoding of carrier signals for use by synchronizing circuitry without using dedicated additional hardware components to observe the USB data stream in parallel to the USB interface/microcontroller 86.

Figure 4:
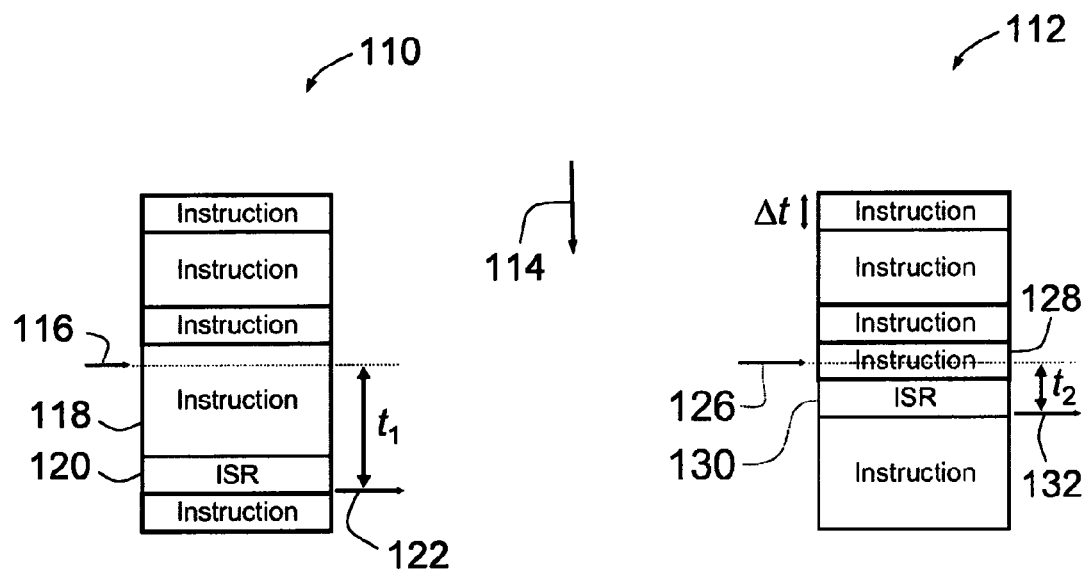
FIG. 4 is a schematic diagram of the command execution stack of two USB interface/microcontrollers according to the embodiment of FIG. 3, showing software interrupt latency and uncertainty.

FIG. 4 is a schematic diagram of, respectively, first and second command execution stacks 110, 112 of two examples of USB interface/microcontrollers 86 according to the embodiment of FIG. 3. Command stacks 110, 112 execute from top to bottom; execution time 114 increases from top to bottom in this view. Microcontroller instructions are integer multiples of a single instruction cycle time and are represented as blocks of time.

At some point in first command stack 110, microcontroller 86 receives a physical interrupt stimulus in the form of a SOF interrupt signal 116 corresponding to an internal hardware register receiving a valid SOF packet in the data stream. This occurs at some point during, in this example, instruction 118 (shown arbitrarily as a three cycle instruction in this example). After completion of instruction 118, microcontroller 86 pushes instructions onto the stack and executes an Interrupt Service Routine (ISR) 120. ISR 120 is generally a series of instructions, but is represented as one instruction here for simplicity. ISR 120 responds to interrupt signal 116 at the next available time and is programmed to generate a software interrupt output signal 122 (which is comparable to reference timing signal 92 of FIG. 3). There is a time delay $t_1$ between reception of physical interrupt signal 116 and software interrupt output signal 122.

Time delay $t_1$ is variable and depends on both the length of an instruction cycle and the position within an instruction cycle that physical interrupt signal 116 is received. This is demonstrated by reference to second exemplary command stack 112. In this example, the microcontroller receives a physical SOF interrupt signal 126 at some point during instruction 128 (which is shown in this figure as a single cycle instruction). After completion of instruction 128, microcontroller 86 executes ISR 130. ISR 130 is generally a series of instructions but has been represented as one instruction here for simplicity. ISR 130 responds to interrupt signal 126 and generates software interrupt output signal 132. There is a time delay $t_2$ between reception of the physical interrupt signal 126 and the outputting of software interrupt output signal 132.

Hence, there is uncertainty—corresponding in magnitude to these time delays $t_1$ and delay $t_2$—in determining the exact reception time of a SOF packet. This uncertainty depends on the duration of the currently executing instruction and the position within that instruction at which a physical SOF interrupt signal is received by the hardware interrupt generator. This is typically given by the period of the longest instruction on a given microcontroller. The best case (i.e. minimum) uncertainty is therefore given by the single cycle instruction cycle, of length $\Delta t$.

Figure 5:
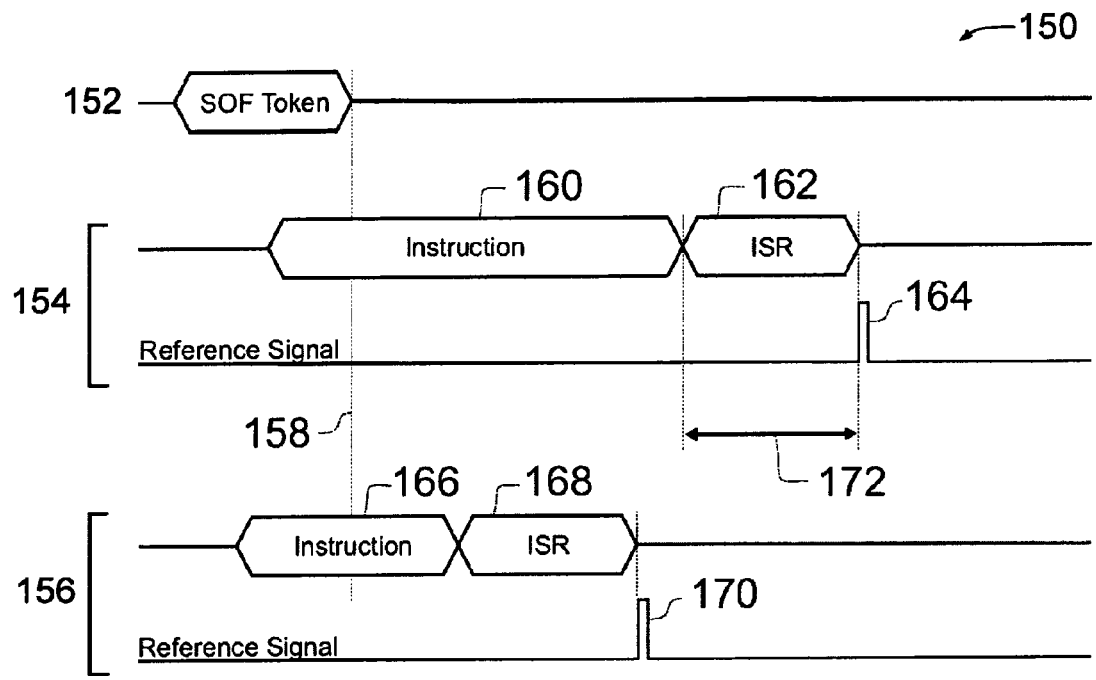
FIG. 5 is a timing diagram of the command execution stack of FIG. 4.

FIG. 5 is a schematic timing diagram 150 for the exemplary command execution stacks 110, 112 of FIG. 4. FIG. 5 includes the reception 152 of a SOF packet and timing diagrams 154 and 156 corresponding to command stacks 110 and 112 of FIG. 4 respectively. Reception 152 of the SOF packet results in a hardware interrupt signal 158 occurring during instruction 160. At the completion of instruction 160, interrupt service routine 162 generates local reference signal 164 which is used as the repetitive synchronization reference signal. Similarly hardware interrupt signal 158 occurs during instruction 166 (corresponding to instruction 128 in command stack 112 of FIG. 4). Interrupt service routine 168 then generates local reference signal 170.

Some microcontrollers have instruction cycle times that range from single instruction cycles to ten or more instruction cycles for complex operations. There is thus significant variability in the uncertainty of any given determination of SOF reception time. If the structure of the software is known, the limits can be determined by the longest instruction execution time and structure of the code. Given the asynchronous nature of the SOF rate and microcontroller code execution there is a random distribution of accurate and inaccurate determinations of SOF reception time.

However it is possible to determine the accuracy of any given determination of SOF reception time, as it is possible to determine which instruction was executing during reception of the SOF and therefore the length of the instruction and of the resulting uncertainty of measurement. This allows any measurements of SOF reception time that are highly uncertain to be identified and hence discarded. Alternatively some form of statistical weighting can be applied to determinations of SOF reception time based on the length of instruction that was executing during its reception, to reduce reliance on measurements that rely on lengthy instructions. The statistical weighting can determine how each measurement is used in controlling the phase locked loop synthesized clock of a synchronized USB device, and only the most reliable determinations of SOF reception time used in controlling the synchronized clock circuitry 90. Furthermore the use of filtering, averaging or other statistical means can be used to improve the accuracy and stability of the synchronized clock.

There is a fixed latency 172 associated with each measurement of SOF reception time. This is the time taken to execute interrupt service routine 162 or 168 respectively. This is constant for each class of microcontroller (assuming identical constant clock frequency and zero batch to batch inconsistencies).

In this way, the present invention provides a means of synchronizing the local clock of a USB device in both frequency and phase, to a repetitive reference carrier signal contained in the USB data stream without using special hardware components that might, for example, add additional parallel capacitive loading to the bus. Additionally, the present invention provides a means of decoding data from the bus and generating a software interrupt based synchronizing reference signal. Such interrupt based reference signals do not require the highly accurate temporal resolution of prior art hardware based synchronization disclosures.

Furthermore the present invention provides a method for estimating the uncertainty of timing accuracy of any given interrupt based synchronizing reference signal and utilizes filtering or statistical means to improve the accuracy and stability of said synchronized clock.

Figure 1:
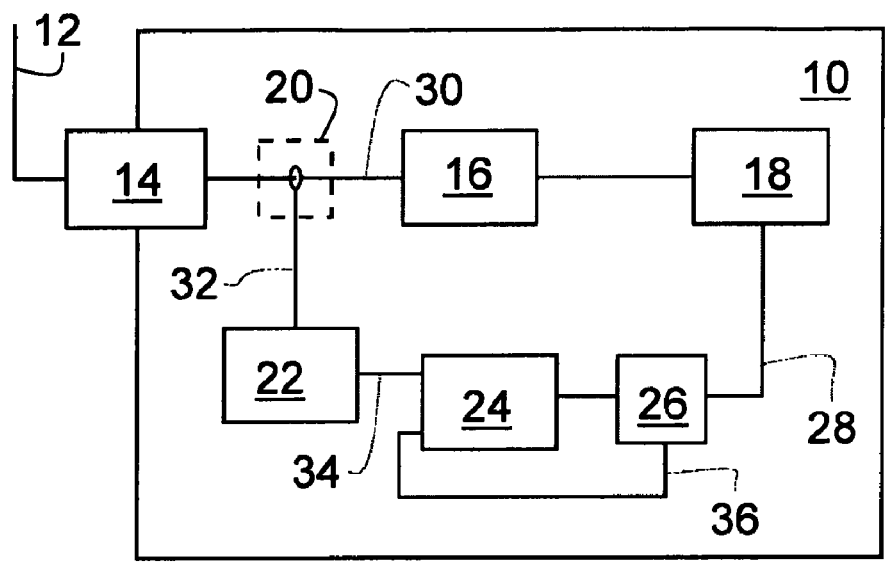
FIG. 1 is a schematic diagram of a background art synchronized USB device.
Figure 2:
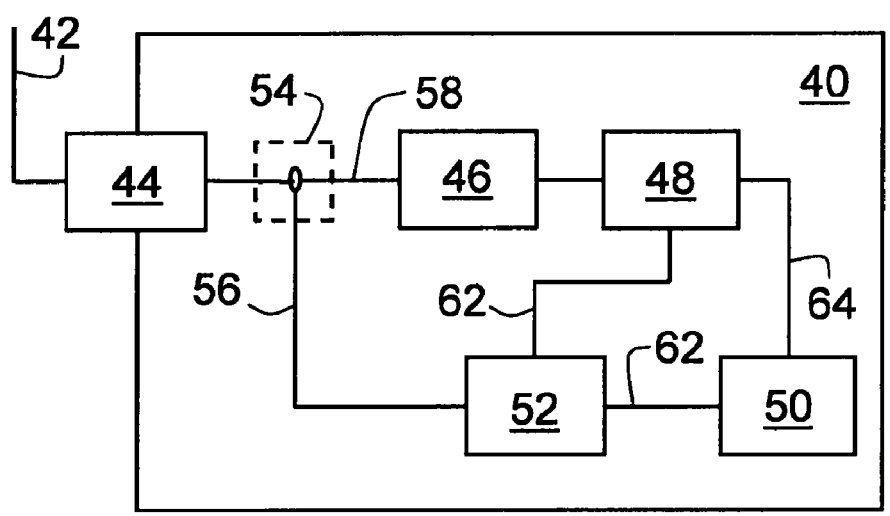
FIG. 2 is a schematic diagram of another background art synchronized USB device.
Figure 6:
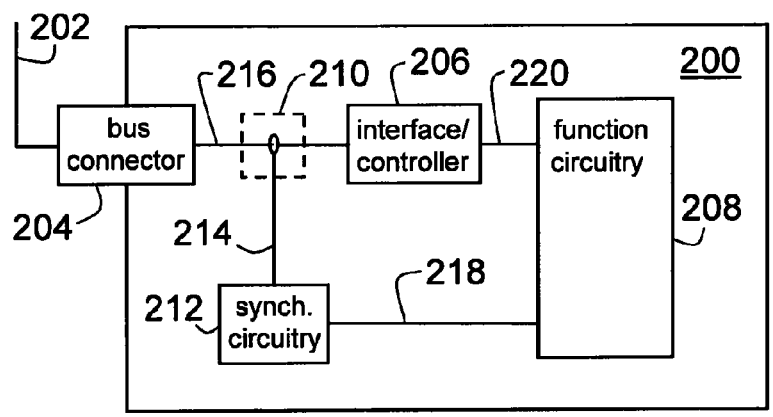
FIG. 6 is a schematic diagram of a synchronized USB device according to a second embodiment of the present invention.

A USB device according to a second embodiment of the present invention is shown schematically at 200 in FIG. 6, with a USB 202. USB device 200 includes a bus connector 204, with which USB device 200 is attached to USB 202. USB device 200 has a bus interface/microcontroller 206, USB device function circuitry (such as a digitally controlled transducer) 208, bus sampling circuitry 210 (comparable to bus sampling circuitry 20 of FIG. 1) and synchronization circuitry 212.

Bus interface circuitry 206 observes the USB data stream present at bus connector 204 and passes a replica 214 of the USB traffic 216 to synchronization circuitry 212. Synchronization circuitry 212 generates synchronous local clock signal 218 which is passed to USB device function circuitry 208, which uses it to synchronously execute commands 220 from bus interface/microcontroller 206. Synchronization circuitry 212 decodes periodic clock carrier signal from USB traffic 216.

Figure 7:
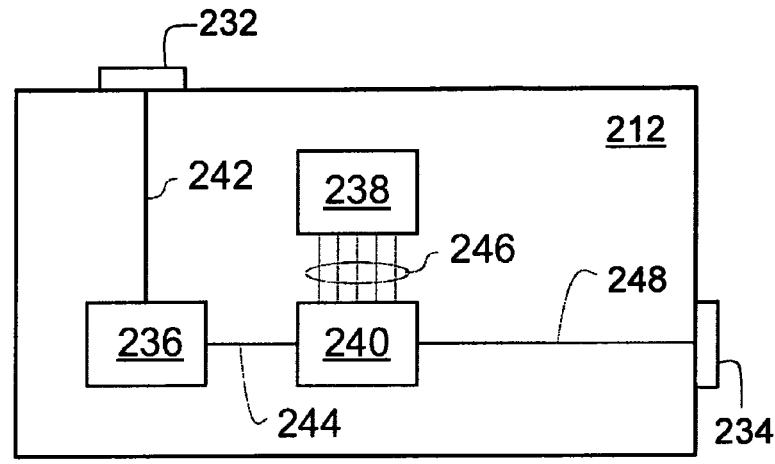
FIG. 7 is a schematic diagram of the synchronizer circuitry of the USB device of FIG. 6.

FIG. 7 is a schematic diagram of synchronization circuitry 212 of the USB device 200 of FIG. 6. Synchronization circuitry 212 has an input port 232 for receiving replica 214 of the USB data traffic, a synchronous clock output port 234, a matched filter 236, a multi-tap free running oscillator clock 238 and a clock selector 240.

Matched filter 236 receives a USB data stream 242 from input port 232. Matched filter 236 decodes the periodic carrier signals (in the form, in this embodiment, of SOF packet tokens) from USB data stream 242 and generates clock synchronizing signal 244. Multi-tap free running oscillator 238 (which may be in the form of free running oscillator coupled to a multi-tap phase delay generator) generates a plurality of phase delayed clock signals 246. Clock selector 240 uses clock synchronizing signal 244 to select output clock signal 248, being a selected one of plurality of phase delayed clock signals 246. It will be appreciated by those skilled in the art that there are many ways of utilizing an inexpensive free running oscillator to generate a plurality of phase delayed cock signals.

In this way synchronization circuitry 230 uses an inexpensive free running oscillator and clock selector circuitry to control the output clock signal phase in a digital control loop to maintain course synchronization. Such a system will generally be less stable and less accurate than a conventional analog phase locked loop architecture (which provides precision phase and frequency control), but this method provides a relatively inexpensive alternative synchronization system because it employs a series of steps (embodied as software or firmware operating in a field programmable gate array) that determines the most appropriate of a plurality of free running clocks to be used at any given time.

Figure 8:
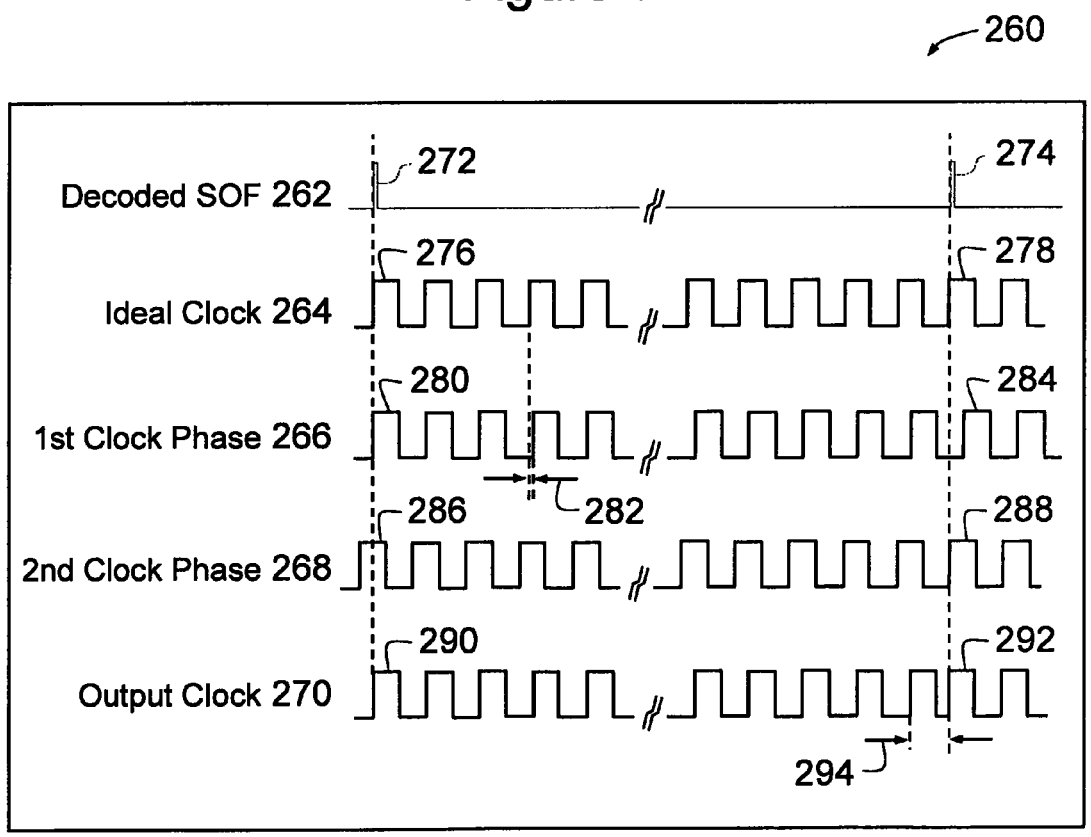
FIG. 8 is a schematic timing diagram of the internal circuitry of the synchronizer circuitry of FIG. 7.

In order to more fully explain the operation of synchronization circuitry 230, FIG. 8 provides a schematic diagram 260 of the clock and control signals within synchronization circuitry 212 of FIG. 7.

Decoded Start of Frame signal 262 (comparable to 244 of FIG. 7) provides the reference signal to which a local synchronized clock must be synchronized. A perfectly synchronized ideal clock 264 is shown for reference along with two phases, first clock phase 266 and second clock phase 268 of local free running oscillator (comparable to two of the plurality of clock phases 246 of FIG. 7). Output clock 270 (comparable to output clock signal 248 of FIG. 7) is the synchronized clock signal (comparable to 218 of FIG. 6) that is used to control the synchronized USB device.

Start of Frame decoded pulse 272 constitutes the beginning and decoded pulse 274 constitutes the end of a synchronization window. The ideal clock 264 is synchronized in frequency and phase such that the leading edge of clock pulse 276 is aligned with decoded pulse 272 and the leading edge of clock pulse 278 is aligned with decoded pulse 274. (The leading edge of the clock pulse may in fact be any repeatable point of the waveform, but the leading edge is chosen for simplicity in this discussion).

The free running oscillator is not operated at a precisely controlled frequency and phase, but rather is allowed to vary in frequency across its entire range.

First clock phase 266 represents one phase of multiphase clock 237 of FIG. 7 and is synchronised 280 with decoded pulse 272. It will be apparent from a comparison of first clock phase 266 and ideal clock 264 that the free running clock is running slower than the ideal clock frequency. This is indicated by phase lag 282, which first clock phase 266 exhibits with respect to ideal clock 264 after several clock cycles (exaggerated in this view for clarity). Although first clock phase 266 is synchronized with decoded pulse 272, by the time the next decoded pulse 274 is received, first clock phase 266 is out of phase as shown by clock pulse 284.

Second clock phase 268 is not synchronized 286 (or in phase) with decoded SOF 272 but, owing to the unsynchronized frequency of local free running oscillator clock 238 of FIG. 7, second clock phase 268 is in phase 288 with decoded SOF 274.

Clock selector 240 of FIG. 7 acts as a digital switch to route one of the plurality of phase delayed clock signals 246 to output port 234 of FIG. 7. Clock selector 240 of FIG. 7 switches synchronously with reception of decoded SOF pulse, selecting the most appropriate one (i.e. most accurately aligned) of the plurality of phase delayed clock signals 246.

In the example of FIG. 8, clock selector circuitry 240 of FIG. 7 has selected first clock phase 266 at SOF pulse 272 and first clock phase 266 continues to be transmitted as output clock 270 until reception of next decoded SOF pulse 274. Second clock phase 268 is most accurately in phase (viz. clock pulse 288) of the plurality of phase delayed clock signals 246 at the moment clock selector circuitry 240 of FIG. 7 receives decoded SOF signal 274. Therefore second clock phase 268 continues to be transmitted as output clock 270 until reception of next decoded SOF pulse. The final clock cycle 294 of output clock 270 prior to reception of decoded SOF 274 is of a different duration to the rest of the output clock cycles. Given the rate of reception of decoded SOF packets and a reasonably selected frequency tolerance for the free running oscillator clock, final clock cycle 294 is only in error by a small fraction of a clock cycle. In this way, the free running oscillator clock is phase adjusted in a digital fashion every time a new decoded SOF is received.

The typical frequency tolerance of free running oscillators is of the order of 50 parts per million to 100 parts per million. A 50 parts per million tolerance for a typical 10 MHz data acquisition oscillator corresponds to a worst possible frequency error of 500 cycles per second. In a USB High Speed system, SOF packets are received at a rate of 8 kHz (or with a period of 125 µs). This means that a maximum of 500 cycles of clock error occur in each 125 µs SOF period, or $\frac{1}{16}$ of a cycle. One sixteenth of a cycle at 10 MHz corresponds to a worst case phase error of 6.25 ns. Cumulative phase error of this magnitude in successive SOF periods is unacceptable for data acquisition applications. However according to the second embodiment of the present invention digital correction of this magnitude of phase error in each SOF period provides an acceptable data acquisition clock.

In this way, the simple digital phase only control loop is used with an inexpensive free running oscillator clock to maintain an output clock frequency that is synchronized with repetitive incoming clock carrier signal from a USB within some acceptable bounds. Furthermore a plurality of USB devices each disposed with similar circuitry forms a synchronized USB.

Modifications within the scope of the invention may be readily effected by those skilled in the art. It is to be understood, therefore, that this invention is not limited to the particular embodiments described by way of example hereinabove and that combinations of the various embodiments described herein are readily apparent to those skilled in the art.

In the preceding description of the invention, except where the context requires otherwise owing to express language or necessary implication, the words "Host Controller" are used to refer to a standard USB Host controller, a USB-on-the-go Host Controller, a wireless USB Host Controller or any other form of USB Host Controller.

In the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge.

The invention claimed is:

1. A method comprising:
observing a decoded carrier signal;
prompting a software interrupt based on a predefined data packet in the decoded carrier signal;
executing in response to the software interrupt an interrupt service routine that generates an interrupt output signal;
generating a timing reference signal in response to commands from the interrupt service routine;
determining a USB microcontroller instruction that was executing when said software interrupt was received;
determining a number of instruction cycles required by the USB microcontroller instruction; and
assigning a timing validity weighting factor to the timing reference signal based on an uncertainty in reception time of the software interrupt.

2. The method as claimed in claim 1, wherein said number of instruction cycles required by the USB microcontroller instruction represents the uncertainty in reception time of the software interrupt.

3. The method as claimed in claim 1, further comprising repeating the steps of claim 1 a plurality of times to generate a plurality of timing reference signals.

4. The method as claimed in claim 1, further comprising:
passing the timing reference signal to synchronized clock circuitry having a phase locked loop architecture; and
locking a local clock in phase and frequency with the synchronized clock circuitry based on the timing reference signal.

5. The method as claimed in claim 1, wherein said timing reference signal is given a higher weighting if it has a lower uncertainty in reception time of the software interrupt and a lower weighting if it has a higher uncertainty in reception time of the software interrupt.

6. The method as claimed in claim 3, including employing one or more statistical methods to filter, average or otherwise process the plurality of timing reference signals for greater accuracy and stability.

7. A method for distributing a timing reference signal, comprising:
connecting a device having a processor to a data bus;
monitoring said data bus with said processor for data signals local to said device, wherein said data contains a periodic data structure;
said processor responding to detection of said periodic data structure by generating a software interrupt;
said processor responding to said software interrupt by executing an interrupt service routine;
said interrupt service routine generating a timing reference signal;
wherein said periodic data structure is one of a plurality of periodic data structures, and the method includes said processor responding to detection of each of said periodic data structures by generating respective software interrupts, said processor responding to said software interrupts by executing respective interrupt service routines, and said interrupt service routine generating respective timing reference signals, the method further comprising:
identifying a software instruction being processed by said processor during reception of said respective software interrupt;
determining a number of instruction cycles required by said processor to execute said software instruction; and
assigning a weighting factor to each of said respective timing reference signals, wherein said weighting factor is a measure of an uncertainty in a period of time between generation of said respective software interrupt and said respective timing reference signal.

8. A method for distributing a timing reference signal, comprising:
connecting a device having a processor to a data bus;
monitoring said data bus with said processor for data signals local to said device, wherein said data contains a periodic data structure;
said processor responding to detection of said periodic data structure by generating a software interrupt;
said processor responding to said software interrupt by executing an interrupt service routine;
said interrupt service routine generating a timing reference signal;
wherein said periodic data structure is one of a plurality of periodic data structures, and the method includes said processor responding to detection of each of said periodic data structures by generating respective software interrupts, said processor responding to said software interrupts by executing respective interrupt service routines, and said interrupt service routine generating respective timing reference signals, the method further comprising:
generating a plurality of weighted timing reference signals by combining a plurality of weighting factors with said plurality of timing reference signals, such that a contribution of a given one of said timing reference signals is weighted by its corresponding weighting factor.

9. The method as claimed in claim 8, further comprising:
statistically processing weighted timing reference signals and thereby locking the frequency and phase of a local clock more precisely.

10. A method for weighting a plurality of clock carrier signals comprising:
monitoring a data bus for a periodic data structure with a processor;
said processor responding to said periodic data structure by generating a software interrupt;
said processor responding to said software interrupt by executing an interrupt service routine;
said interrupt service routine generating a timing reference signal;
determining a software instruction being processed by said processor during reception of said software interrupt;
determining a number of instruction cycles required by said processor to execute said software instruction, wherein said number of instruction cycles represents a measure of an uncertainty in determination of a time said processor issued said software interrupt; and
weighting said plurality of clock carrier signals according to said measure of the uncertainty in said time that said processor issued said software interrupt.

11. The method as claimed in claim 10, wherein said periodic data structure is one of a plurality of periodic data structures, and the method comprises:
said processor responding to each of said periodic data structures by generating respective software interrupts;
said processor responding to said software interrupts by executing respective interrupt service routines;
said interrupt service routine generating respective timing reference signals;
assigning a weighting factor to each of said timing reference signals, wherein said weighting factor is a measure of an uncertainty in a period of time between generation of said software interrupt and said respective timing reference signal;
generating a plurality of weighted timing reference signals by combining said plurality of weighting factors with said plurality of timing reference signals, such that the contribution of a given one of said timing reference signals is weighted by its corresponding weighting factor.

12. The method as claimed in claim 11, including determining the uncertainty in the period of time between generation of said software interrupt and said respective timing reference signal with a computing device or a lookup table.

13. An apparatus for weighting a plurality of timing reference signals comprising:
a processor that supports interrupt service routines;
circuitry for observing data traffic locally to said processor;
circuitry for decoding a periodic data structure from said data traffic;
circuitry for generating an acknowledgement signal corresponding to decoding of said periodic data structure;
circuitry for generating a software interrupt of said processor configured to issue an interrupt service routine upon receipt of said acknowledgement signal; and
circuitry for generating a timing reference signal in response to commands from an interrupt service routine, the apparatus further comprising:
an output for reporting which instruction was being executed when said software interrupt occurred;
a mechanism for determining an uncertainty in a period of time between generation of said software interrupt and said timing reference signal;
a mechanism for calculating a weighting factor for each of said plurality of timing reference signals.

14. The apparatus as claimed in claim 13, wherein said mechanism for determining the uncertainty in the period of time between generation of said software interrupt and said timing reference signal is a computing device or a lookup table.

15. The apparatus as claimed in claim 13, wherein said processor of (i) has an embedded USB physical interface or (ii) is a field programmable gate array or other form of programmable logic.

16. The apparatus as claimed in claim 13, wherein said processor is a field programmable gate array or other form of programmable logic, which has an embedded USB physical interface.

17. The apparatus as claimed in claim 13, wherein said timing reference signal is given a higher weighting factor if it has a lower uncertainty in a period of time between generation of said software interrupt and said timing reference signal, and a lower weighting factor if it has a higher uncertainty in a period of time between generation of said software interrupt and said timing reference signal.

18. A method for generating a synchronized USB, comprising synchronizing a respective local clock of each of a plurality of USB devices, wherein said synchronizing is achieved by a method comprising:
- observing a decoded carrier signal;
- prompting a software interrupt based on a predefined data packet in the decoded carrier signal;
- executing in response to the software interrupt an interrupt service routine that generates an interrupt output signal;
- generating a timing reference signal in response to commands from the interrupt service routine;
- determining a USB microcontroller instruction that was executing when said software interrupt was received;
- determining a number of instruction cycles required by the USB microcontroller instruction; and
- assigning a timing validity weighting factor to the timing reference signal based on the uncertainty in reception time of the software interrupt.

19. A synchronized USB, comprising a plurality of apparatuses for weighting a plurality of timing reference signals, wherein each of said apparatuses comprises:
- a processor that supports interrupt service routines;
- circuitry for observing data traffic locally to said processor;
- circuitry for decoding a periodic data structure from said data traffic;
- circuitry for generating an acknowledgement signal corresponding to decoding of said periodic data structure;
- circuitry for generating a software interrupt of said processor configured to issue an interrupt service routine upon receipt of said acknowledgement signal; and
- circuitry for generating a timing reference signal in response to commands from an interrupt service routine, the apparatus, further comprising:
- an output for reporting which instruction was being executed when said software interrupt occurred;
- a mechanism for determining an uncertainty in the a period of time between generation of said software interrupt and said timing reference signal;
- a mechanism for calculating a weighting factor for each of said plurality of timing reference signals.

* * * * *

UNITED STATES PATENT AND TRADEMARK OFFICE
CERTIFICATE OF CORRECTION

PATENT NO. : 8,412,975 B2
APPLICATION NO. : 12/529112
DATED : April 2, 2013
INVENTOR(S) : Foster It is certified that error appears in the above-identified patent and that said Letters Patent is hereby corrected as shown below:

In the Claim

Column 19, Claim 15, Line 7, replace "processor of (i)" with --processor (i)--.

Signed and Sealed this
Twenty-eighth Day of January, 2014

Michelle K. Lee
*Deputy Director of the United States Patent and Trademark Office*